US012763987B2

(12) United States Patent
Smid et al.

(10) Patent No.: US 12,763,987 B2
(45) Date of Patent: Oct. 13, 2026

(54) ZONAL CONTROL ARCHITECTURE FOR SOFTWARE-DEFINED VEHICLE

(71) Applicant: MAGNA INTERNATIONAL INC., Aurora (CA)

(72) Inventors: Gert Edzko Smid, Oxford, MI (US); Gerd Schlager, St. Valentin (AT); Bruno Carraro, Royal Oak, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 140 days.

(21) Appl. No.: 18/716,207

(22) PCT Filed: Dec. 13, 2022

(86) PCT No.: PCT/US2022/052623

§ 371 (c)(1),
(2) Date: Jun. 4, 2024

(87) PCT Pub. No.: WO2023/114165

PCT Pub. Date: Jun. 22, 2023

(65) Prior Publication Data

US 2025/0039015 A1 Jan. 30, 2025

Related U.S. Application Data

(60) Provisional application No. 63/288,872, filed on Dec. 13, 2021.

(51) Int. Cl.
*H04L 12/40* (2006.01)
*B60R 16/023* (2006.01)

(52) U.S. Cl.
CPC ............ *H04L 12/40* (2013.01); *B60R 16/023* (2013.01); *H04L 2012/40215* (2013.01); *H04L 2012/40273* (2013.01)

(58) Field of Classification Search
CPC .............................. H04L 12/40; B60R 16/023
See application file for complete search history.

(56) References Cited

U.S. PATENT DOCUMENTS

| | | | | |
|---|---|---|---|---|
| 9,751,506 | B2 * | 9/2017 | Mudalige | G01S 17/931 |
| 2008/0262727 | A1 | 10/2008 | Manson et al. | |
| 2014/0333256 | A1 * | 11/2014 | Widmer | B60L 53/30 320/108 |
| 2018/0267794 | A1 | 9/2018 | Atchison et al. | |
| 2020/0117495 | A1 * | 4/2020 | Samii | G06F 9/5083 |
| 2021/0234760 | A1 * | 7/2021 | Fang | H04W 4/40 |

(Continued)

FOREIGN PATENT DOCUMENTS

| | | | |
|---|---|---|---|
| WO | 2017035536 | A1 | 3/2017 |
| WO | 2021198893 | A1 | 10/2021 |

*Primary Examiner* — Henry Tsai
*Assistant Examiner* — Aurangzeb Hassan
(74) *Attorney, Agent, or Firm* — Dickinson Wright PLLC

(57) ABSTRACT

An electrical control system for a vehicle includes: a plurality of zone controllers each associated with a corresponding physical region of the vehicle, and each having an identical hardware configuration: a high-speed digital communications network interconnecting the plurality of zone controllers; and a plurality of I/O controllers each including at least one of: an input circuit configured to receive a digital or analog signal from a sensor device, or an output circuit configured to produce and transmit a digital or analog signal to an output device.

20 Claims, 10 Drawing Sheets

(56) References Cited

U.S. PATENT DOCUMENTS

| | | | | |
|---|---|---|---|---|
| 2021/0250340 | A1* | 8/2021 | Green | H04L 12/40013 |
| 2021/0314078 | A1* | 10/2021 | Zinner | H04L 12/40 |
| 2022/0063419 | A1* | 3/2022 | Kwon | B60L 50/70 |
| 2022/0314940 | A1* | 10/2022 | Kim | B60K 35/28 |

* cited by examiner

*(CONT.) - 3*

(CONT.) - 5

ZONAL CONTROL ARCHITECTURE FOR SOFTWARE-DEFINED VEHICLE

CROSS-REFERENCE TO RELATED APPLICATION

This U.S. National Stage Patent Application claims the benefit of PCT International Patent Application Serial No. PCT/US2022/052623 filed Dec. 13, 2022 entitled "ZONAL CONTROL ARCHITECTURE FOR SOFTWARE-DEFINED VEHICLE" which claims the benefit of and priority to U.S. Provisional Patent Application Ser. No. 63/288,872 filed on Dec. 13, 2021 titled "Zonal Control Architecture For Software-Defined Vehicle," the entire disclosures of which are hereby incorporated by reference.

FIELD

The present disclosure relates generally to electrical and electronic control systems for vehicles, such as passenger cars or trucks.

BACKGROUND

Electrical and Electronic (E/E) architectures for control in automotive vehicles, such as passenger cars and trucks, are increasingly complex with the introduction of additional features in each of several different domains, such as advanced driver assistance systems (ADAS), Body, Powertrain, Chassis, Exteriors, etc.

Traditional approaches to designing a vehicle's E/E architecture may be increasingly expensive and may impose limits on desirable functionality, such as over-the-air (OTA) updates. The automotive industry has responded to the consumer trends by gradually adding more and more electronic control units (ECUs). Operating those ECUs includes millions of lines of code and hundreds of specialized suppliers and parts. Many traditional E/E architectures have reached their scalability limits. Such traditional E/E architectures can only be surpassed by a technological shift, which in turn creates new challenges.

Zonal E/E architectures are described in "Smart Vehicle Architecture" white paper by Lee Bauer of Aptiv; "Zonal Architecture: the Foundation for Next-Generation Vehicles" publication by Guard Knox; and in "Zonal EE Architecture: Towards a Fully Automotive Ethernet-Based Vehicle Infrastructure" by Jochen Klaus-Wagenbrenner dated Sep. 24, 2019.

SUMMARY

The present disclosure provides an electrical control system for a vehicle. The electrical control system comprises: a plurality of zone controllers each associated with a corresponding physical region of the vehicle, and each having an identical hardware configuration; a high-speed digital communications network interconnecting the plurality of zone controllers; and a plurality of I/O controllers each including at least one of: an input circuit configured to receive a digital or analog signal from a sensor device, or an output circuit configured to produce and transmit a digital or analog signal to an output device.

The present disclosure also provides a method of operating an electrical control system for a vehicle. The method comprises: receiving, by an input circuit of an I/O controller, a digital or analog input signal from a sensor device; producing, by an output circuit of the I/O controller, a digital or analog output signal to an output device; sending, by each of the plurality of I/O controllers and via a communication bus, data regarding the digital or analog signal from the sensor device, to a corresponding one of a plurality of zone controllers each associated with a corresponding physical region of the vehicle; and sending, by the corresponding one of a plurality of zone controllers via the communications bus, a command to the I/O controller to cause I/O controller to produce the digital or analog output signal. Each zone controller of the plurality of zone controllers have an identical hardware configuration.

BRIEF DESCRIPTION OF THE DRAWINGS

Further details, features and advantages of designs of the invention result from the following description of embodiment examples in reference to the associated drawings.

DETAILED DESCRIPTION

Figure 1:
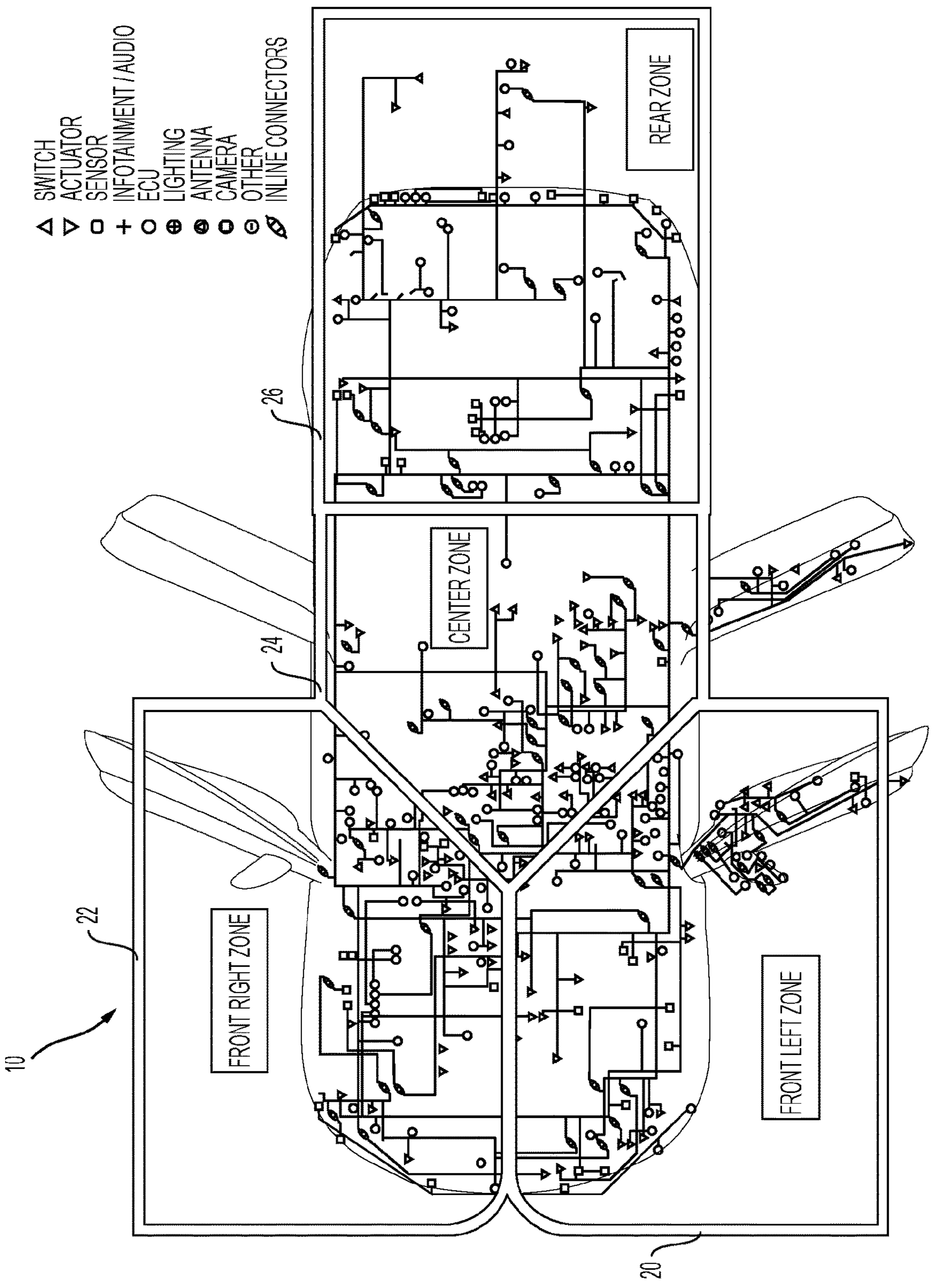
FIG. 1 shows a top view of a vehicle with a schematic diagram showing various electrical devices, controllers, and wiring interconnections, and with four zones.

Referring to the drawings, the present invention will be described in detail in view of following embodiments.

It is an objective of the systems and methods of the present disclosure to provide an Electrical and Electronic (E/E) architecture that is cost efficient, reduces harness complexity, consolidates [feature application] software. It is also an objective of the systems and methods of the present disclosure to simplify and unify the software development process for an E/E architecture in a vehicle. It is also an objective of the systems and methods of the present disclosure to support over-the-air (OTA) updates.

The systems and methods of the present disclosure provide a single-zone ECU hardware design, which can provide improvements in lifecycle management (LCM), manufacturing, cost, maintenance, etc. The systems and methods of the present disclosure provide for a cost-efficient zone controller design, due to distributed/shared performance requirements of the multiple zone controllers. Each zone controller may only need to be able to partially execute a feature, since the functions in the feature can be hosted on multiple controllers. For example, processing signals from multiple different radar sensors can be performed by each of several different zone controllers, and those signals may be combined at a higher level, such as by fusing object data obtained from the different zone controllers.

The single-zone ECU hardware design of the present disclosure may enable use of a single, combined, software development environment, which may provide improvements in software development cost, tools, LCM, OTA, cybersecurity, etc.

The systems and methods of the present disclosure provide an optimization method for ECU location and SW hosting allocation, which can enable optimizing system performance vs. cost. The systems and methods of the present disclosure provide an optimization method and runtime scheduler for load balancing of the multiple zone controllers in the system. The system architecture of the present disclosure allows for adding or modifying SW features across the vehicle and for a variety of different applications including, but not limited to, infotainment.

According to an aspect of the present disclosure, an E/E system for a vehicle includes a high-speed Ethernet backbone. Such high-speed Ethernet may operate at speeds of 10 Gigabit per second (Gbps) or greater. This Ethernet backbone may replace CANbus architectures used in traditional E/E systems.

According to another aspect of the present disclosure, an E/E system for a vehicle provides for hardware consolidation, including consolidating multiple functions that are traditionally served by separate ECUs into new, multifunctional ECUs. According to another aspect of the present disclosure, an E/E system for a vehicle provides for Wiring Optimization. The E/E systems of the present disclosure provide consolidation of ECUs together with new topologies for the vehicle networks to reduce the needed cabling length, weight, and cost to a fraction of conventional system designs.

According to another aspect of the present disclosure, an E/E system for a vehicle provides a Software-Driven Service-Oriented Architecture. The vehicle software architecture is evolving towards a Service-Oriented Architecture that can accommodate the needed flexibility, security and agility for the new software-defined vehicles.

A unique aspect of the system of the present disclosure, is the re-use of one single Zone Controller design. For example, the system may include 4 zone controllers, each having an identical hardware configuration. The zone controllers may only differentiate in the software that is running on them. In some embodiments, none of the zone controllers in the system of the present disclosure may considered a “Gateway” or a “High Performance Compute (HPC)”.

In some embodiments, application software, such as software providing various features and functions, runs on the zone controllers. In some embodiments, the Zone Controllers only support communication interfaces. For example, the zone controllers may have no I/O connections. The zone controllers may have no field-accessible input connections to provide electrical interfaces for input devices, such as switches or sensors. The zone controllers may have no field-accessible output connections to provide electrical interfaces for output devices, such as indicators, speakers, or actuators.

Figure 2:
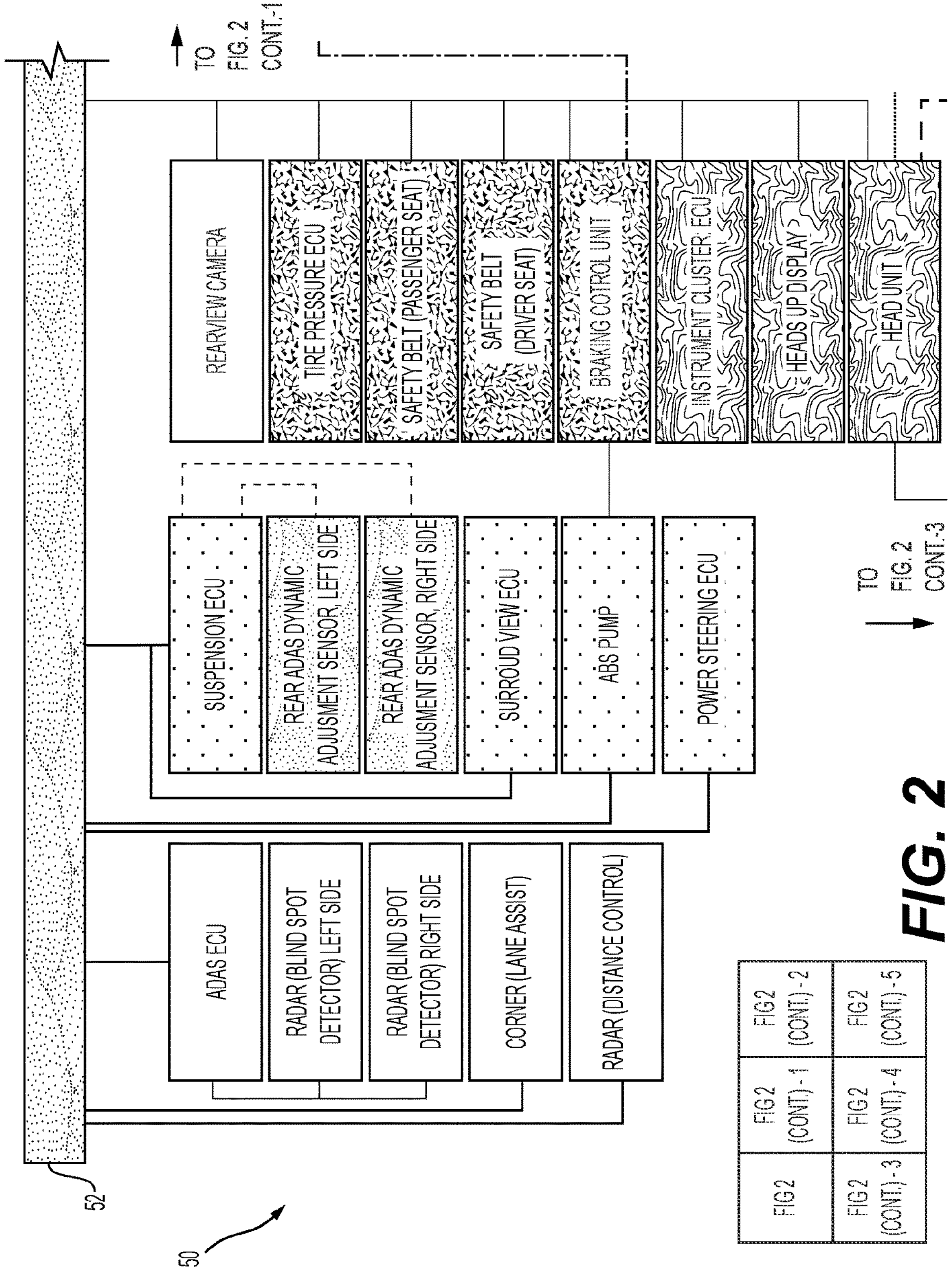
FIG. 2 shows a block diagram of a network topology in a vehicle.
Figure 2:
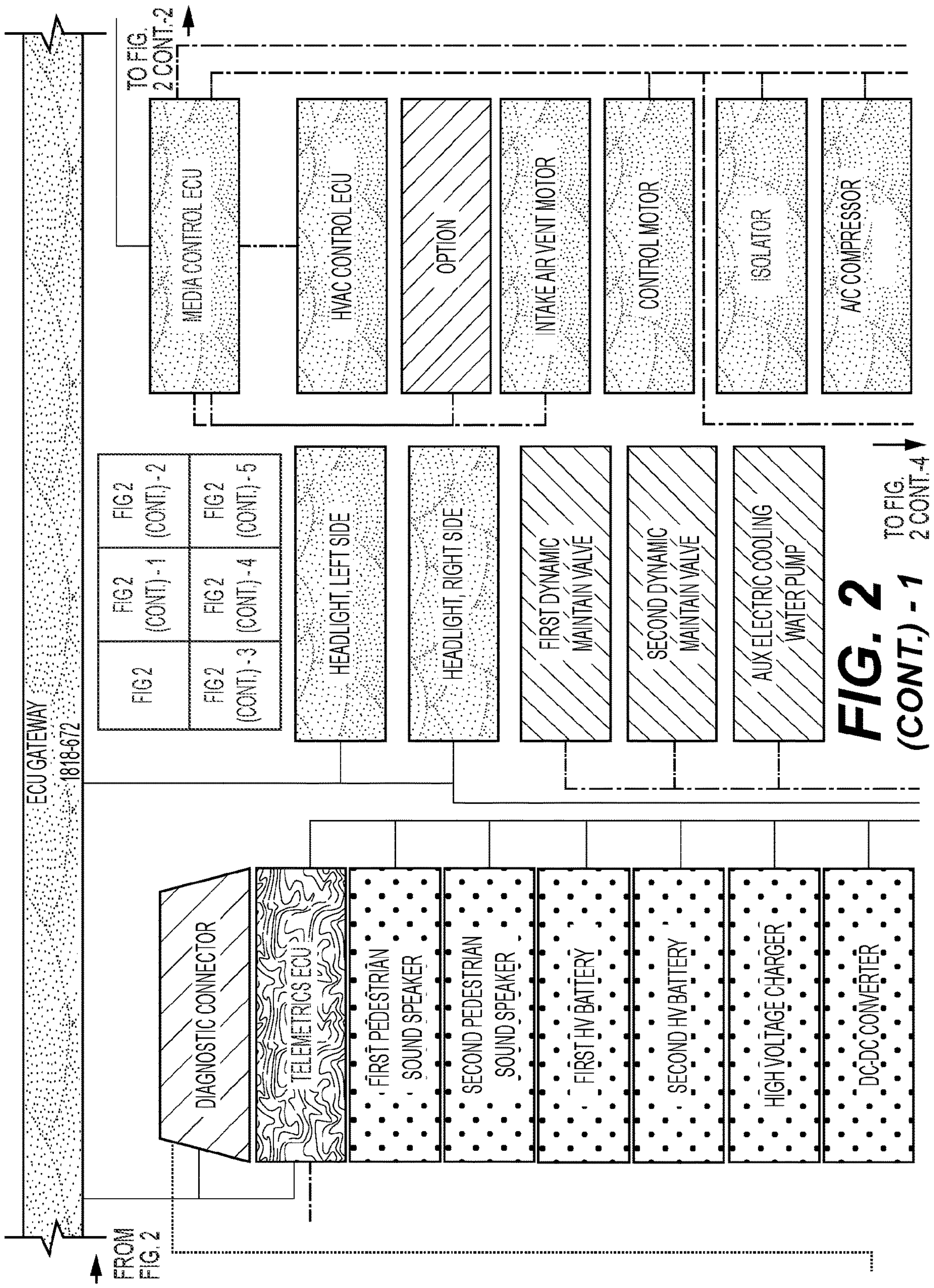
Figure 2:
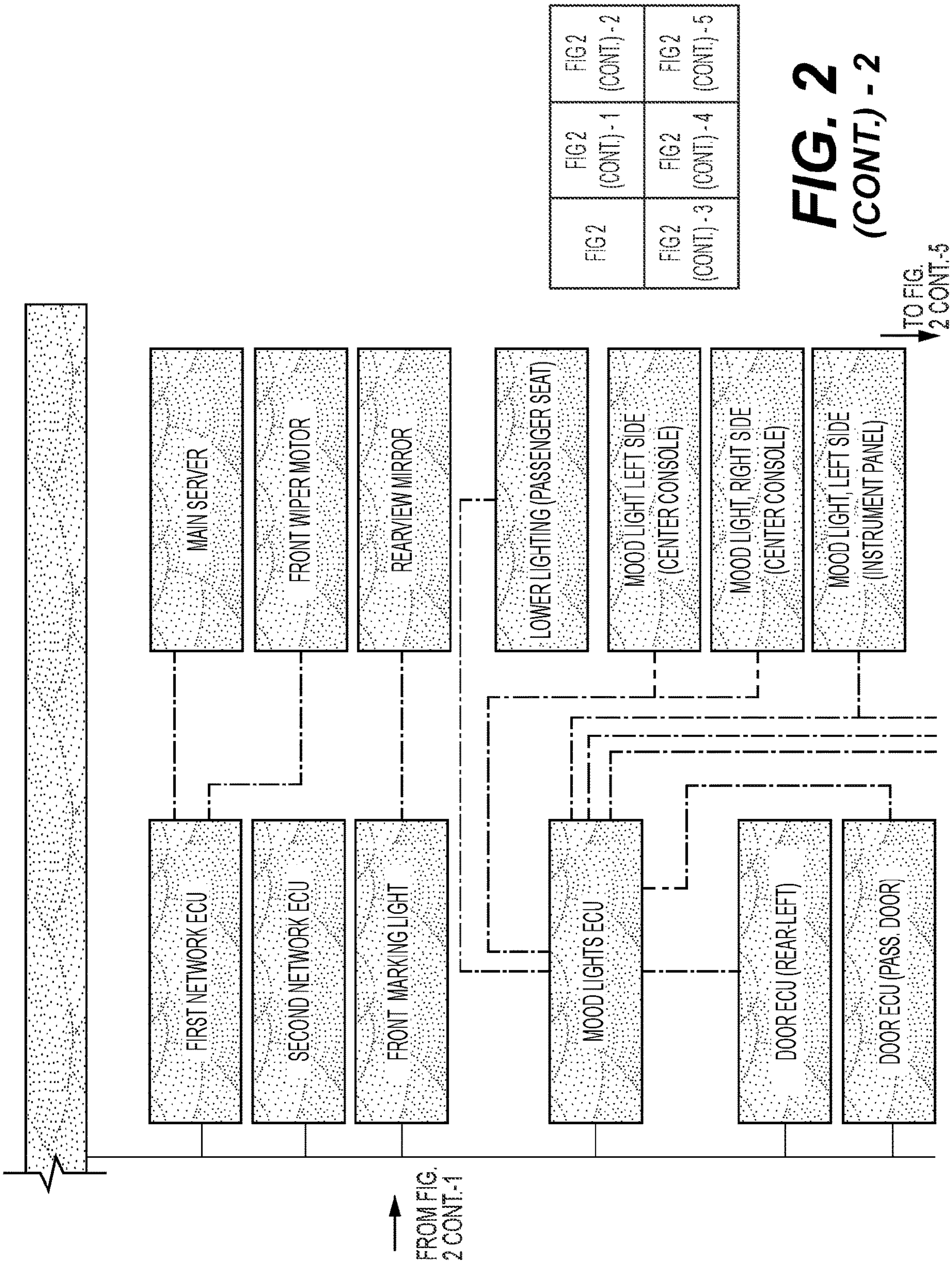
Figure 2:
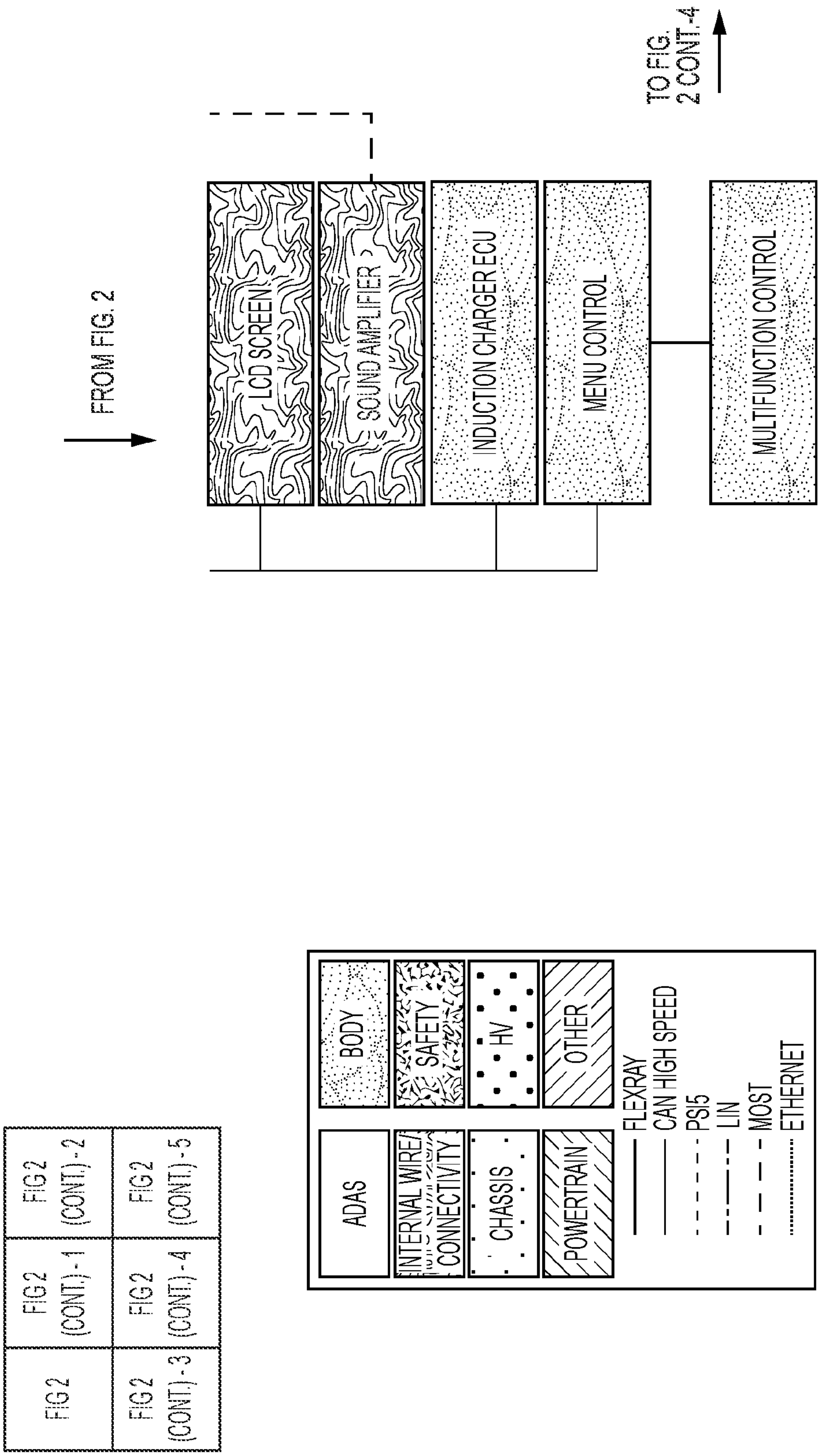
Figure 2:
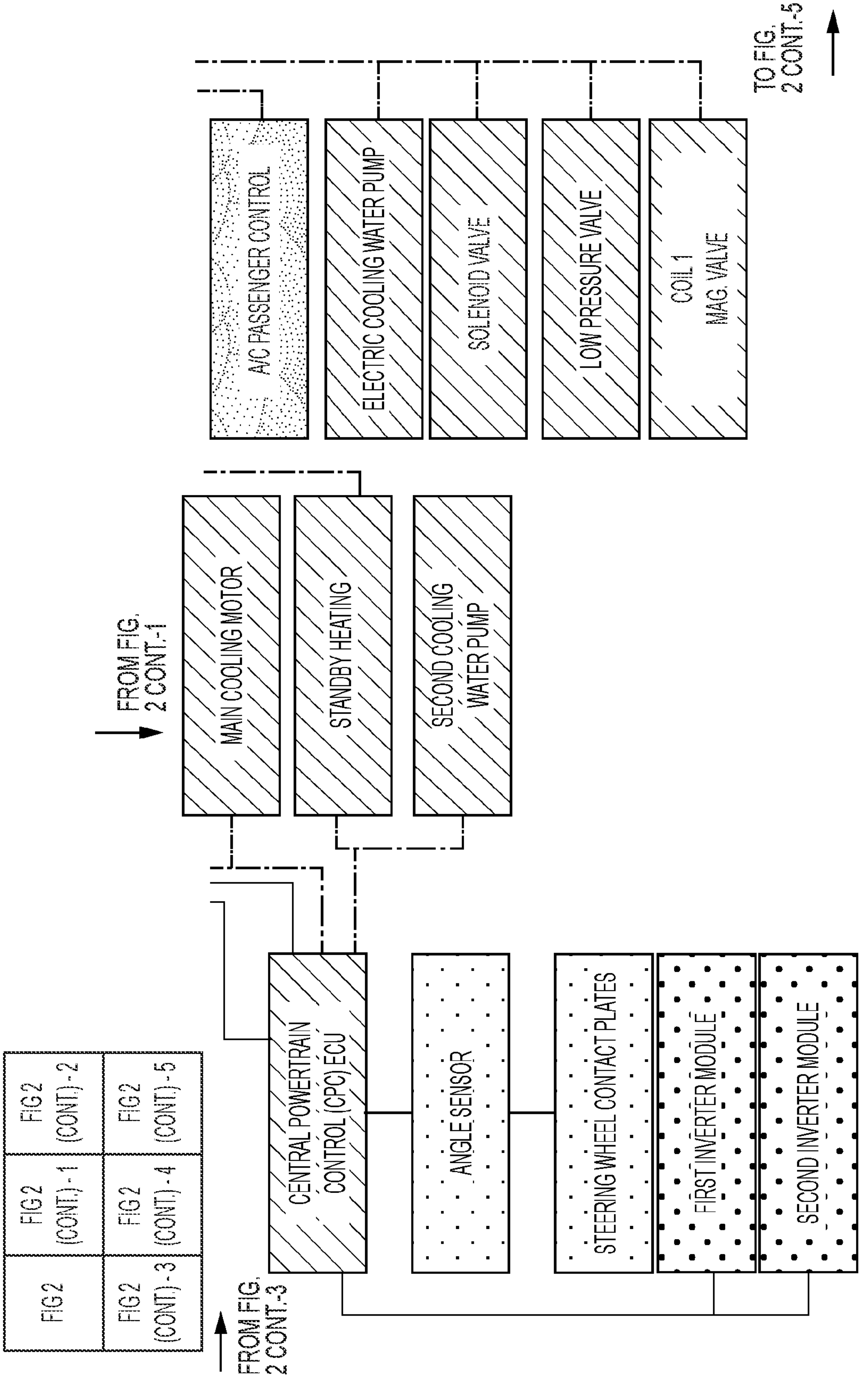
Figure 2:
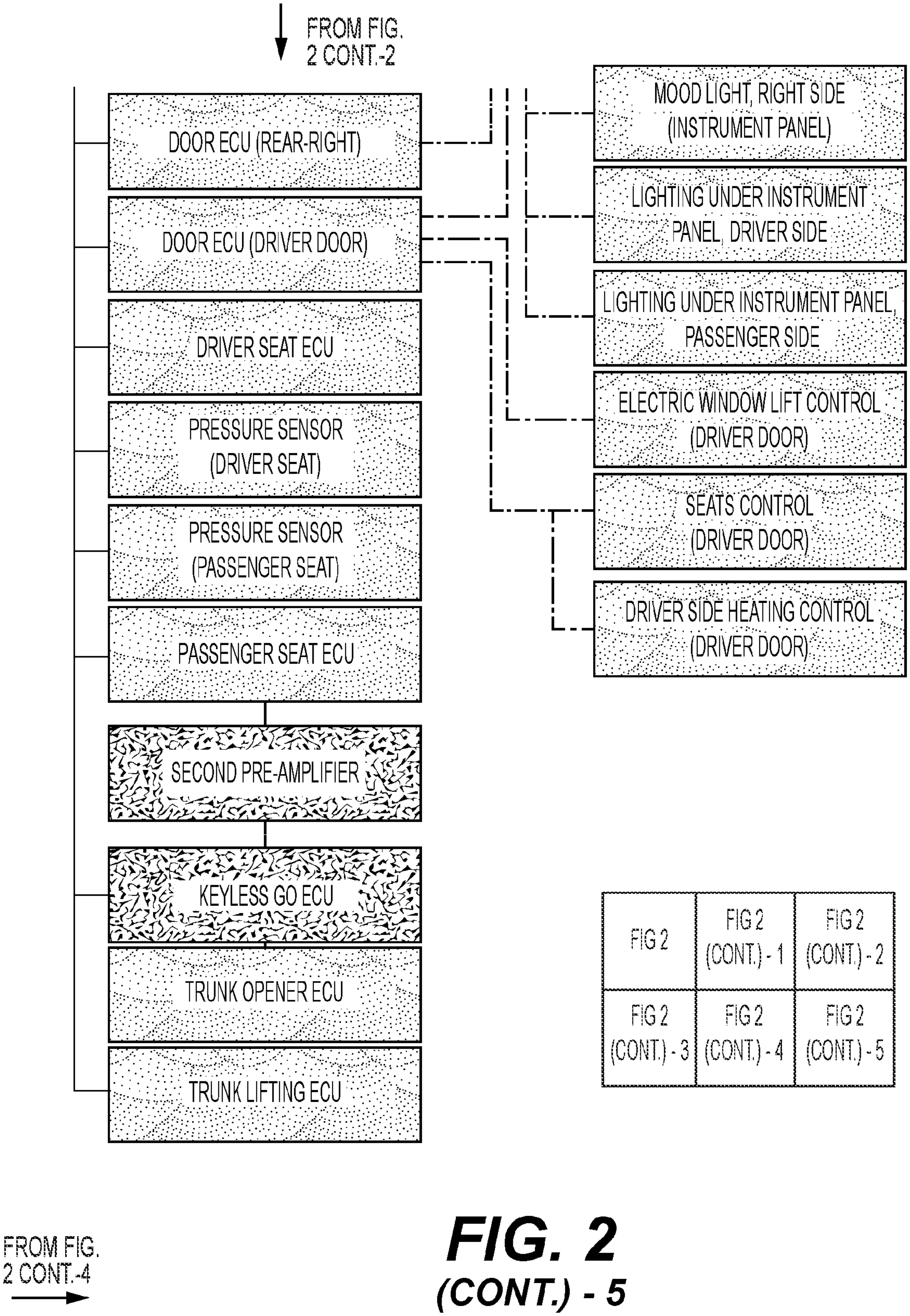

FIG. 1 shows a top view of a vehicle 10 with a schematic diagram showing various electrical devices, electrical control units (ECUs), and wiring interconnections, and with the vehicle 10 divided into four zones 20, 22, 24, 26. FIG. 1 shows an average vehicle. High-end vehicles may have up to 150 ECUs distributed across the vehicle 10. FIG. 2 shows a block diagram of a network topology 50 in a vehicle 10. The network topology diagram of FIG. 2 lists the ECU’s in the vehicle 10 by communication bus. This diagram illustrates the distributed nature of all the software functions and applications. The network topology 50 includes an ECU gateway that interconnects each of several different networks and functional groups of ECUs. The network topology diagram of FIG. 2 includes several different functional groups of ECUs, each identified with a different color, and including ADAS, Body, Instrumentation, Safety, Chassis, Audiovisual (AV), Powertrain (PT), and Other. The network topology diagram of FIG. 2 includes several different types of communications networks interconnecting the ECUs, each identified with a different color, and including FlexRay, high-speed CAN, PSI5, LIN, MOST, and Ethernet. However, the vehicle 10 may include other categories of ECUs and/or different types of communications networks.

Figure 3:
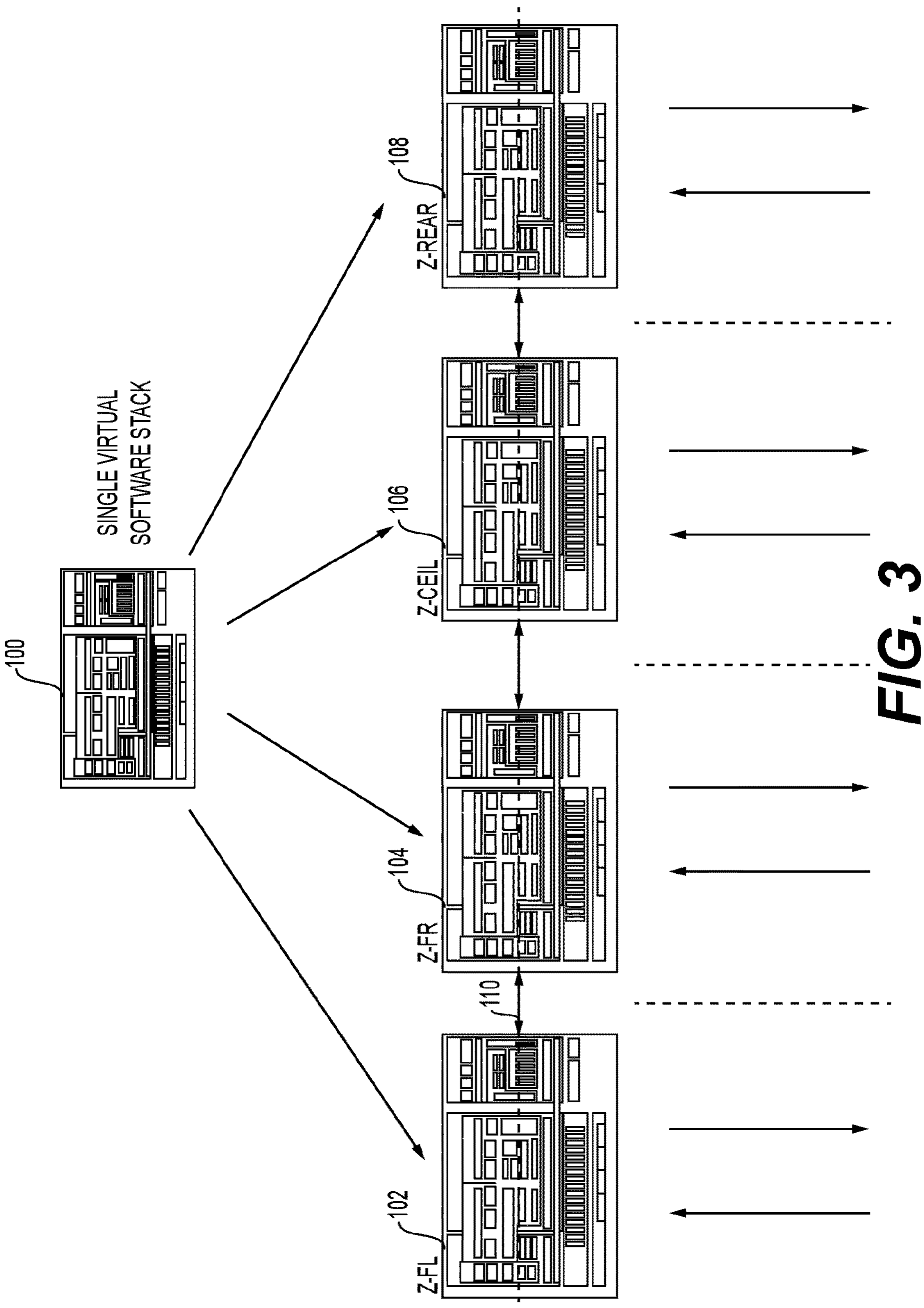
FIG. 3 shows a block diagram showing Zone electrical control units (ECUs) in a Zonal Architecture in accordance with an aspect of the present disclosure.

FIG. 3 shows a block diagram showing zone electrical control units (ECUs), also called zone controllers 102, 104, 106, 108, in a zonal architecture in accordance with an aspect of the present disclosure. The proposed zonal architecture consists of [for example] 4 identical zone controllers 102, 104, 106, 108 installed in different locations in the vehicle 10. Each of the zone controller 102, 104, 106, 108 communicates with a unique collection of peripherals, as configured by software. At the application level, the zone architecture with the multiple zone controllers 102, 104, 106, 108 is perceived by the feature functions as a single software stack 100, where all signals are available, independent from the physical location to the hardware.

Figure 4:
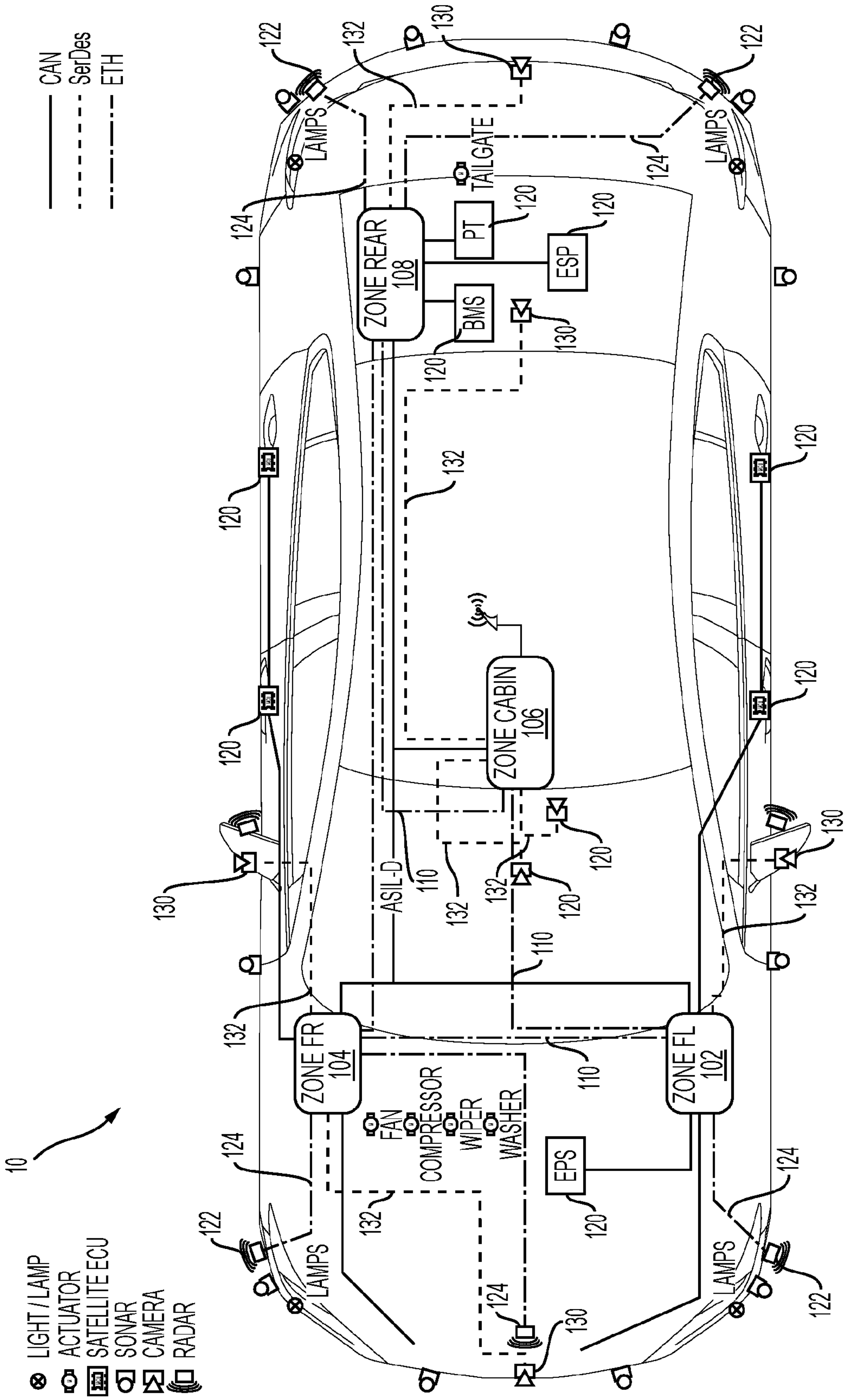
FIG. 4 shows a top view of a vehicle with a schematic diagram showing devices and interconnections therebetween in Zonal Architecture in accordance with an aspect of the present disclosure.

FIG. 4 shows a top view of a vehicle 10 with a schematic diagram showing devices and interconnections therebetween in zonal architecture in accordance with an aspect of the present disclosure. FIG. 4 illustrates the zonal E/E architecture of the present disclosure, with four of the zone controllers 102, 104, 106, 108 connected via an Ethernet backbone in ring configuration. However, the zonal architecture of the present disclosure may be configured with any number of the zone controllers 102, 104, 106, 108, such as 3 or 5 of the zone controllers 102, 104, 106, 108, each having an identical hardware configuration.

The system of the present disclosure may include one or more I/O controllers 120, which may also be called amplifier boards or EDGE ECUs, to provide electrical inputs and outputs, such as receiving discrete sensor inputs, and/or driving discrete actuators. In some embodiments, the system includes a plurality of I/O controllers, each including one or more input circuits and/or output circuits. The input circuits of the I/O controllers may each be configured to receive a digital or analog signal from a sensor device. The output circuits of the I/O controllers may each be configured to produce and transmit a digital or analog signal to an output device, such as an indicator, a speaker, or an actuator. In some embodiments, the output circuits of the I/O controllers may provide electrical power to operate the output device. Alternatively or additionally, an output device may receive power, such as electrical, hydraulic, pneumatic, or mechanical power, from another source. An output circuit of the I/O controller may provide a low-power control signal, which may control operation of a device using such an external power source. An actuator may include one or more electromechanical devices, such as solenoid actuators, electric motors, etc.

One or more of the I/O controllers 120 may be located at or near a location sensors and/or actuators connected thereto. For example, a door of the vehicle may include one of the I/O controllers 120 for monitoring various switches on the door and for controlling actuators for a latch and for a power window of the door.

As shown in FIG. 4, the I/O controllers 120 may include a powertrain controller (PT) configured to control and monitor functions of a powertrain, such as an engine, transmission, electric motor, motor drive, etc., an electronic stability control program controller (ESP) configured to control application of brakes and/or throttle, a battery management system controller (BMS) configured to monitor and control the charging and discharging of rechargeable batteries.

In some embodiments, one or more of the of the I/O controllers 120 may be located near or adjacent to a corresponding one of the zone controllers 102, 104, 106, 108 in order to interface with sensors and actuators in the vicinity of the zone controller. Each of the zone controllers 102, 104, 106, 108 may interface with one or more of the of the I/O controllers via a communication bus, such as an Ethernet or a controller area network (CAN) bus. However, other communications bus types may be used.

Each of the zone controllers 102, 104, 106, 108 is associated with a corresponding one of the zones 20, 22, 24, 26 in the vehicle 10. In some embodiments, the zones 20, 22, 24, 26 may be defined to minimize lengths or costs of wiring between the zone controllers 102, 104, 106, 108 and the I/O controllers connected thereto.

As also shown in FIG. 4, the vehicle 10 includes a first Ethernet network 110 interconnecting the zone controllers 102, 104, 106, 108. In some embodiments, and as shown in FIG. 4, the vehicle 10 includes a plurality of RADAR sensors 122 each connected to a corresponding one of the zone controllers 102, 104, 106, 108 via a second Ethernet connection 124. The second Ethernet connections 124 may be separate from the first Ethernet network 110. Alternatively, the second Ethernet connections 124 may be integrated with the first Ethernet network 110. However, another type of communications network may be used to communicate RADAR sensor data from the RADAR sensors 122 to the zone controllers 102, 104, 106, 108.

In some embodiments, and as shown in FIG. 4, the vehicle 10 includes a plurality of cameras 130 each connected to a corresponding one of the zone controllers 102, 104, 106, 108 via a serializer/deserializer (SerDes) connection 132. However, another type of communications network may be used to communicate image data from the cameras 130 to the zone controllers 102, 104, 106, 108.

The system of the present disclosure provides for a hardware architecture and a software architecture. In some embodiments, the hardware architecture is separate and isolated from the software architecture. The system of the present disclosure provides for hardware simplification by optimizing harnesses and using a single, common design for the zone controllers. The system of the present disclosure provides for software simplification by using a single software stack with the physical backbone as a "shared memory". In some embodiments, one or more software applications may be executed on any of the zone controllers. In some embodiments, all software applications in the system may be executed on any of the zone controllers.

In some embodiments, a given one of the zone controllers 102, 104, 106, 108 may not be able to perform all functions of a single functional domain, such as infotainment, powertrain and vehicle dynamics, connectivity, body and comfort, and/or Advanced Driver Assistance Systems (ADAS), which may include driving automation. However, a combination of a plurality of zone controllers, such as four or more of the zone controllers, with Software hosted in a balanced configuration, and a ultra-high speed backbone (e.g. a network supporting speeds of 10 Gigabit per second (Gbps) or greater) can execute feature application software of all Domains. For example, each of the zone controllers may be able to process up to 3 or 4 camera feeds. This would not be adequate for ADAS features. But 4 of the zone controllers can process 12 to 16 cameras. Together they can execute ADAS features [at least] up to level 3 based on the "Levels of Driving Automation" standard by SAE International that defines six levels of driving automation, as specified in SAE standard J3016.

In some embodiments, the zone controllers 102, 104, 106, 108 may have identical hardware and may be configured to share data via an ultra-fast backbone, as if it is shared memory, then together the zone controllers 102, 104, 106, 108 can be considered as a single Software execution environment 100, with pooled or combined hardware resources. For example, a system including four of the zone controllers 102, 104, 106, 108 may have four times the hardware resources of each of the zone controllers, 102, 104, 106, 108, alone. Hardware resources are distributed in the vehicle (by Zone Controller install locations) to minimize harness complexity.

In some embodiments, one or more of the zone controllers 102, 104, 106, 108 may process complex sensor data before exchanging it via the backbone to other ones of the of the zone controllers 102, 104, 106, 108. For example, a given one of the of the zone controllers 102, 104, 106, 108 that receives camera data should process this camera data first, and communicate a processed dataset for the camera image via the backbone to other ones of the of the zone controllers 102, 104, 106, 108. Processed data could be a compressed image, a cropped image, a subsampled image, or aby other form of data reduction. Alternatively, the given one of the of the zone controllers 102, 104, 106, 108 could determine objects in an image and communicate an object list via the backbone.

The use of identical hardware for each of a plurality of the zone controllers 102, 104, 106, 108 may provide benefits in manufacturing, lifecycle management, and may reduce cost by increased purchasing volumes (e.g., 4×same parts per vehicle). In some embodiments, the system of the present disclosure may provide redundancy. For example, the system may be configured such that any of the zone controllers 102, 104, 106, 108 can host and execute any software in the vehicle 10. This redundancy may also allow for load balancing. A resource manager can decide where to execute an application software based on available compute resources. Such a configuration may be called a software-defined vehicle (SDV) or a unified software environment (USE). In some embodiments, the resource manager may be distributed amongst one or more of the zone controllers 102, 104, 106, 108. Alternatively or additionally, the resource manager may be located in a separate controller that is independent of the zone controllers 102, 104, 106, 108.

Optimization Process

Software functions are typically executed in the ECU where the critical sensor information is acquired. But in runtime, a vehicle-global scheduler may activate a software application function on any of the Zone controllers where adequate compute resource is available. The Ethernet Backbone will ensure that the function has access to the required inputs and parameters, and will be able to provide its outputs to the vehicle system.

In some embodiments, one or more of the zone controllers 102, 104, 106, 108 may include a microcontroller (MCU) safety domain. Time-critical functions may be executed in the MCU safety domain of the corresponding one of the zone controllers 102, 104, 106, 108. This MCU safety domain may be rated for Automotive Safety Integrity Level (ASIL) Functional Safety ASIL-D per functional safety standards, such as the risk classification scheme defined by the ISO 26262-Functional Safety for Road Vehicles standard.

In some embodiments, one or more of the zone controllers 102, 104, 106, 108 may include performance domain. High performance functions, such as machine learning, image processing, etc. may be executed in the performance domain of the corresponding one of the zone controllers 102, 104, 106, 108. This performance domain may be rated for a lower functional safety level than the MCU safety domain, such as ASIL-B.

Figure 5:
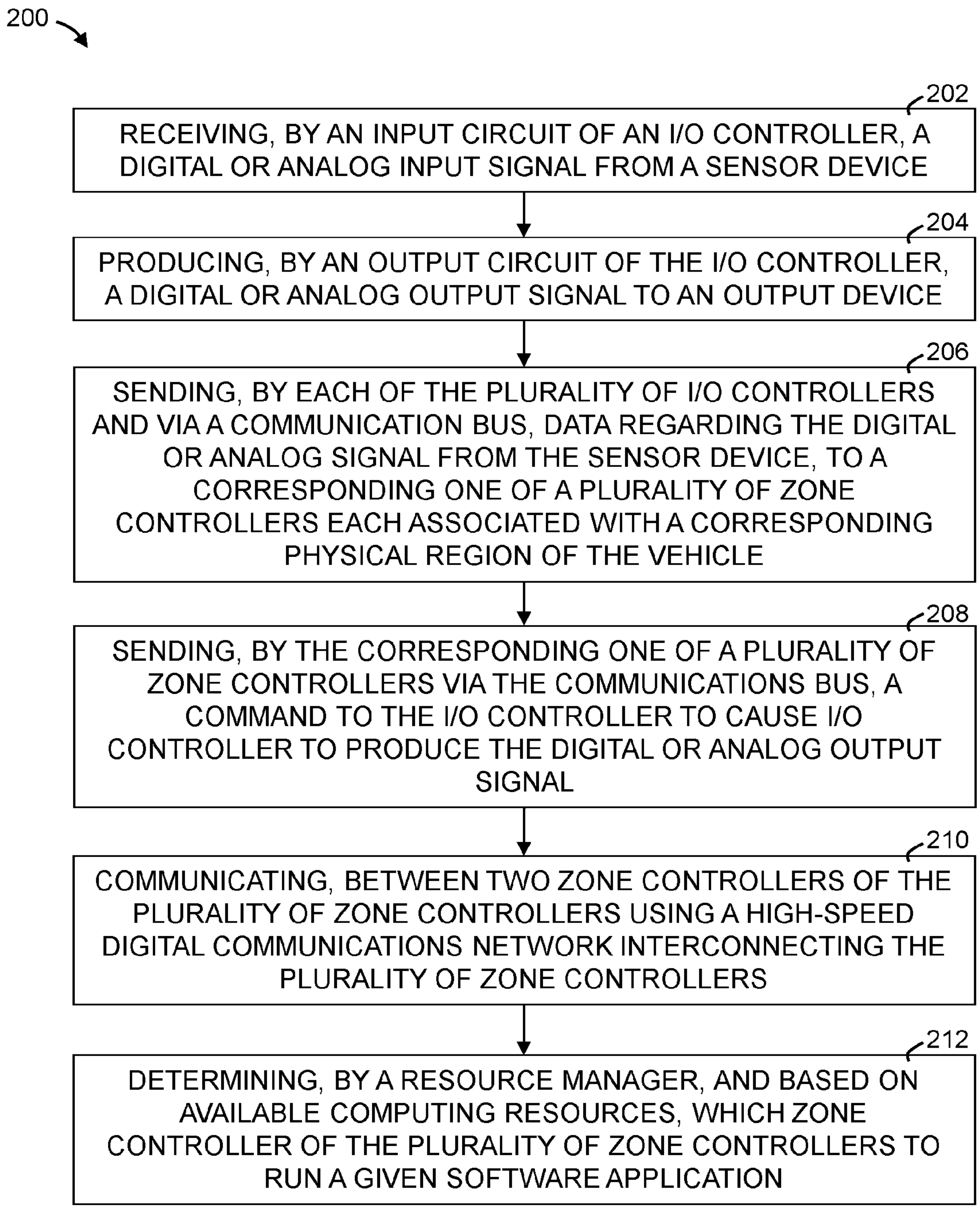
FIG. 5 shows a flowchart listing steps in a method of operating an electrical control system for a vehicle, in accordance with an aspect of the present disclosure.

A method 200 of operating an electrical control system for a vehicle is shown in FIG. 5. As can be appreciated in light of the disclosure, the order of operation within the method is not limited to the sequential execution as illustrated in FIG. 5, but may be performed in one or more varying orders as applicable and in accordance with the present disclosure.

The method 200 includes receiving, by an input circuit of an I/O controller, a digital or analog input signal from a sensor device at step 202.

The method 200 also includes producing, by an output circuit of the I/O controller, a digital or analog output signal to an output device at step 204.

The method 200 also includes sending, by each of the plurality of I/O controllers and via a communication bus, data regarding the digital or analog signal from the sensor device, to a corresponding one of a plurality of zone controllers each associated with a corresponding physical region of the vehicle at step 206. Each zone controller of the plurality of zone controllers may have an identical hardware configuration.

The method 200 also includes sending, by the corresponding one of a plurality of zone controllers via the communications bus, a command to the I/O controller to cause I/O controller to produce the digital or analog output signal at step 208. The communications bus may include, for example, an Ethernet bus or a controller area network (CAN) bus.

In some embodiments, the method 200 may also include communicating, between two zone controllers of the plurality of zone controllers using a high-speed digital communications network interconnecting the plurality of zone controllers at step 210.

In some embodiments, the plurality of zone controllers may be configured to run a plurality of different software applications, and each of the zone controllers may be configured to host and execute any software application of the plurality of different software applications.

In some embodiments, the method 200 may further include determining, at step 212, by a resource manager, and based on available computing resources, which zone controller of the plurality of zone controllers to run a given software application.

An electrical control system for a vehicle comprises: a plurality of zone controllers each associated with a corresponding physical region of the vehicle, and each having an identical hardware configuration; a high-speed digital communications network interconnecting the plurality of zone controllers; and a plurality of I/O controllers each including at least one of: an input circuit configured to receive a digital or analog signal from a sensor device, or an output circuit configured to produce and transmit a digital or analog signal to an output device.

In some embodiments, each zone controller of the plurality of zone controllers includes only digital communications interfaces. In some embodiments, the high-speed digital communications network includes an Ethernet network. In some embodiments, the Ethernet network operates at a speed of at least 1.0 Gigabit per second. In some embodiments, the Ethernet network operates at a speed of at least 10 Gigabits per second.

In some embodiments the plurality of zone controllers are configured to run a plurality of different software applications; and each zone controller of the plurality of zone controllers is configured to host and execute any software application of the plurality of different software applications.

In some embodiments, the electrical control system further comprises a resource manager configured to determine, based on available computing resources, which zone controller of the plurality of zone controllers to run a given software application of the plurality of different software applications.

In some embodiments, the plurality of zone controllers include at least four zone controllers.

In some embodiments, the electrical control system further comprises an application software stored on a given zone controller of the plurality of zone controllers; and a resource manager configured to direct any of the zone controllers to download and run the application software from the given zone controller; and each zone controller of the plurality of zone controllers is configured to download and run the application software in response to a direction from the resource manager. This may operate as or similarly to similarly to a network files system.

In some embodiments, a single software development is used to develop the application software, and the application software is not specific to any zone controller of the plurality of zone controllers.

In some embodiments, a single data dictionary defines all global signals in the architecture.

A method of operating an electrical control system for a vehicle comprises: receiving, by an input circuit of an I/O controller, a digital or analog input signal from a sensor device; producing, by an output circuit of the I/O controller, a digital or analog output signal to an output device; sending, by each of the plurality of I/O controllers and via a communication bus, data regarding the digital or analog signal from the sensor device, to a corresponding one of a plurality of zone controllers each associated with a corresponding physical region of the vehicle; and sending, by the corresponding one of a plurality of zone controllers via the communications bus, a command to the I/O controller to cause I/O controller to produce the digital or analog output signal. Each zone controller of the plurality of zone controllers have an identical hardware configuration.

In some embodiments, the communications bus includes at least one of an Ethernet bus or a controller area network (CAN) bus.

In some embodiments, the method further includes communicating, between two zone controllers of the plurality of zone controllers using a high-speed digital communications network interconnecting the plurality of zone controllers.

In some embodiments, the plurality of zone controllers are configured to run a plurality of different software applications, and each zone controller of the plurality of zone controllers is configured to host and execute any software application of the plurality of different software applications.

In some embodiments, the method further includes determining, by a resource manager, and based on available computing resources, which zone controller of the plurality of zone controllers to run a given software application of the plurality of different software applications.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical control system for a vehicle, comprising:

a plurality of zone controllers each associated with a corresponding physical region of the vehicle, and each having an identical hardware configuration;

a high-speed digital communications network interconnecting the plurality of zone controllers; and a plurality of I/O controllers each including at least one of: an input circuit configured to receive a digital or analog signal from a sensor device, or an output circuit configured to produce and transmit a digital or analog signal to an output device, wherein each zone controller of the plurality of zone controllers interfaces with one or more I/O controllers of the plurality of I/O controllers via a communications bus independent of the high-speed digital communications network, and wherein the plurality of zone controllers are configured to share data via the high-speed digital communications network, and to thereby function as a single software execution environment with pooled or combined hardware resources.

2. The electrical control system of claim 1, wherein each zone controller of the plurality of zone controllers includes only digital communications interfaces.

3. The electrical control system of claim 1, wherein the high-speed digital communications network includes an Ethernet network that operates at a speed of at least 10 gigabits per second.

4. The electrical control system of claim 1, wherein the plurality of zone controllers are configured to run a plurality of different software applications; and wherein each zone controller of the plurality of zone controllers is configured to host and execute any software application of the plurality of different software applications.

5. The electrical control system of claim 4, further comprising a resource manager configured to determine, based on available computing resources, which zone controller of the plurality of zone controllers to run a given software application of the plurality of different software applications.

6. The electrical control system of claim 1, wherein the plurality of zone controllers include at least four zone controllers.

7. An electrical control system for a vehicle, comprising:

a plurality of zone controllers each associated with a corresponding physical region of the vehicle, and each having an identical hardware configuration;

a high-speed digital communications network interconnecting the plurality of zone controllers;

a plurality of I/O controllers each including at least one of: an input circuit configured to receive a digital or analog signal from a sensor device, or an output circuit configured to produce and transmit a digital or analog signal to an output device;

an application software stored on a given zone controller of the plurality of zone controllers; and a resource manager configured to direct any of the zone controllers to download and run the application software from the given zone controller, wherein each zone controller of the plurality of zone controllers interfaces with one or more I/O controllers of the plurality of I/O controllers via a communications bus independent of the high-speed digital communications network, and wherein each zone controller of the plurality of zone controllers is configured to download and run the application software in response to a direction from the resource manager.

8. The electrical control system of claim 7, wherein the resource manager is implemented by at least one zone controller of the plurality of zone controllers.

9. The electrical control system of claim 7, wherein the resource manager is separate and independent of the plurality of zone controllers.

10. The electrical control system of claim 1, wherein a single software development is used to develop application software for the electrical control system, and the application software is not specific to any zone controller of the plurality of zone controllers.

11. The electrical control system of claim 1, further comprising a single Data Dictionary that defines all global signals.

12. The electrical control system of claim 1, wherein the communications bus includes at least one of a serializer/deserializer (SerDes) connection, and a controller area network (CAN) bus.

13. The electrical control system of claim 1, wherein the plurality of I/O controllers include at least one of: a powertrain controller (PT) configured to control and monitor functions of a powertrain, an electronic stability control program controller (ESP) configured to control application of brakes and/or a throttle, and a battery management system controller (BMS) configured to monitor and control charging and discharging of a rechargeable battery.

14. The electrical control system of claim 1, further comprising a plurality of remote sensing devices each connected to a corresponding zone controller of the plurality of zone controllers via a digital communications interface.

15. The electrical control system of claim 14, wherein the plurality of remote sensing devices includes one or more cameras.

16. The electrical control system of claim 14, wherein the plurality of remote sensing devices includes one or more RADAR sensors.

17. A method of operating an electrical control system for a vehicle, comprising:

receiving, by an input circuit of an I/O controller of a plurality of I/O controllers, a digital or analog input signal from a sensor device;

producing, by an output circuit of the I/O controller, a digital or analog output signal to an output device;

sending, by each of the plurality of I/O controllers and via a communication bus, data regarding the digital or analog signal from the sensor device, to a corresponding one of a plurality of zone controllers each associated with a corresponding physical region of the vehicle; and sending, by the corresponding one of a plurality of zone controllers via the communications bus, a command to the I/O controller to cause I/O controller to produce the digital or analog output signal, and communicating, between two zone controllers of the plurality of zone controllers, using a high-speed digital communications network interconnecting the plurality of zone controllers, wherein each zone controller of the plurality of zone controllers have an identical hardware configuration, wherein each zone controller of the plurality of zone controllers interfaces with one or more I/O controllers of the plurality of I/O controllers, and wherein the plurality of zone controllers are configured to run a plurality of different software applications, and wherein each zone controller of the plurality of zone controllers is configured to host and execute any software application of the plurality of different software applications.

18. The method of claim 17, wherein the communications bus includes at least one of an Ethernet bus or a controller area network (CAN) bus.

19. The method of claim 17, further comprising: determining, by a resource manager, and based on available computing resources, which zone controller of the plurality of zone controllers to run a given software application of the plurality of different software applications.

20. The method of claim 19, wherein the resource manager is implemented by at least one zone controller of the plurality of zone controllers.

* * * * *